United States Patent
Buffe et al.

(10) Patent No.: US 10,913,817 B2
(45) Date of Patent: Feb. 9, 2021

(54) USE OF A COMPOSITION OF LOW-VISCOSITY BIS-ANHYDROHEXITOL ETHERS AS A REACTIVE DILUENT FOR CROSSLINKABLE RESIN, ADHESIVE, COATING AND MATRIX COMPOSITIONS FOR COMPOSITES

(71) Applicant: Roquette Freres, Lestrem (FR)

(72) Inventors: Clothilde Buffe, Lomme (FR); Jean-Pierre Pascault, Villeurbanne (FR); Loureiro Roi Meizoso, Ferrol (ES); Pilar Prendes Gonzales, Coruña (ES); Senén Paz Abuin, Vadoviño (ES)

(73) Assignee: ROQUETTE FRERES, Lestrem (FR)

( * ) Notice: Subject to any disclaimer, the term of this patent is extended or adjusted under 35 U.S.C. 154(b) by 0 days.

(21) Appl. No.: 15/752,203

(22) PCT Filed: Aug. 8, 2016

(86) PCT No.: PCT/FR2016/052052
§ 371 (c)(1),
(2) Date: Feb. 12, 2018

(87) PCT Pub. No.: WO2017/025687
PCT Pub. Date: Feb. 16, 2017

(65) Prior Publication Data
US 2020/0123308 A1  Apr. 23, 2020

(30) Foreign Application Priority Data

Aug. 13, 2015 (FR) .................... 15 57712

(51) Int. Cl.
| | | |
|---|---|---|
| *C08G 59/26* | (2006.01) | |
| *C08G 59/38* | (2006.01) | |
| *C08L 63/00* | (2006.01) | |
| *C09D 163/00* | (2006.01) | |
| *C09J 163/00* | (2006.01) | |
| *C08G 59/14* | (2006.01) | |
| *C08G 59/24* | (2006.01) | |
| *C08G 59/50* | (2006.01) | |

(52) U.S. Cl.
CPC ......... *C08G 59/145* (2013.01); *C08G 59/245* (2013.01); *C08G 59/5026* (2013.01); *C09D 163/00* (2013.01); *C09J 163/00* (2013.01)

(58) Field of Classification Search
None
See application file for complete search history.

(56) References Cited

U.S. PATENT DOCUMENTS

| | | |
|---|---|---|
| 3,041,300 A | 6/1962 | Morrison |
| 3,272,845 A | 9/1966 | Zech et al. |
| 4,770,871 A | 9/1988 | Greenshields |
| 2014/0073716 A1 | 3/2014 | Cho et al. |
| 2014/0370298 A1 | 12/2014 | Owusu-Adom et al. |
| 2015/0005408 A1 | 1/2015 | Lindekens et al. |
| 2015/0010697 A1* | 1/2015 | Soncini ............. C08G 59/42 427/116 |
| 2015/0307650 A1* | 10/2015 | Hammond ......... C08G 59/26 528/96 |
| 2017/0002132 A1* | 1/2017 | Buffe ................ C07D 493/04 |
| 2017/0253692 A1* | 9/2017 | Lee .................. C08G 59/504 |

FOREIGN PATENT DOCUMENTS

| | | |
|---|---|---|
| CN | 103619848 A | 3/2014 |
| CN | 104080828 A | 10/2014 |
| CN | 104203900 A | 12/2014 |
| FR | 1445942 A | 9/1964 |
| FR | 3 016 631 A1 | 7/2015 |
| GB | 1002440 A | 8/1965 |
| JP | 1-307935 A | 12/1989 |
| JP | 2001-106766 A | 4/2001 |
| JP | 2013-54531 A | 3/2013 |
| WO | WO 2008/147472 A1 | 12/2008 |
| WO | WO 2008/147473 A1 | 12/2008 |
| WO | 2012/041816 A1 | 4/2012 |
| WO | WO 2012/157832 A1 | 11/2012 |
| WO | WO 2013/188253 A1 | 12/2013 |

* cited by examiner

*Primary Examiner* — Michael J Feely
(74) *Attorney, Agent, or Firm* — Oliff PLC

(57) ABSTRACT

The present invention relates to the use of bis-anhydrohexitol ethers as reactive diluents in a crosslinkable resin, adhesive, coating or composite matrix composition. Not only do these products make it possible to advantageously reduce the viscosity of the mixtures obtained, but they also lead to a very small reduction in the glass transition temperature of the crosslinked mixtures, compared to other reactive diluents, while spectacularly improving the mechanical properties of the latter such as the Young's modulus, the tensile strength, the elongation at break and the toughness.

23 Claims, 1 Drawing Sheet

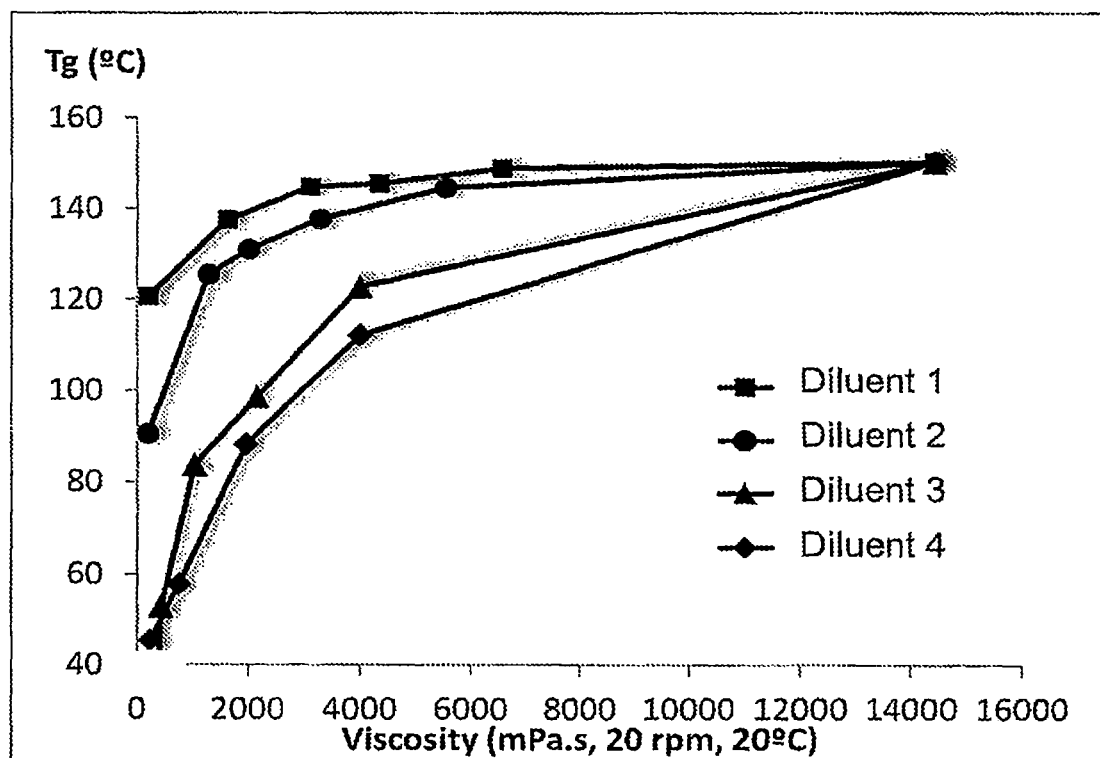

USE OF A COMPOSITION OF LOW-VISCOSITY BIS-ANHYDROHEXITOL ETHERS AS A REACTIVE DILUENT FOR CROSSLINKABLE RESIN, ADHESIVE, COATING AND MATRIX COMPOSITIONS FOR COMPOSITES

CROSS REFERENCE TO RELATED APPLICATIONS

This application is a U.S. national stage application of International patent application No. PCT/FR2016/052052, filed Aug. 8, 2016, which claims the priority of French application No. 1557712, filed Aug. 13, 2015, the subject matter of each incorporated in their entirety by reference herein.

The present invention relates to the use of bis-anhydrohexitol ethers as reactive diluents for the preparation of a polymerizable and/or crosslinkable resin, adhesive, coating or composite matrix composition. Not only do these products make it possible to advantageously reduce the viscosity of the mixtures obtained, but they also lead to a very small reduction in the glass transition temperature of the crosslinked mixtures, compared to other reactive diluents, while spectacularly improving the mechanical properties of the latter such as the Young's modulus, the tensile strength, the elongation at break and the toughness.

Reactive diluents are products or mixtures of products that have a relatively high boiling point (or a low saturation vapor pressure) and also a relatively low viscosity. Reference is generally made to a threshold value of 500 mPa·s for their Brookfield viscosity as measured at 25° C., as indicated in the article "19.1 Diluents" of the Ullmann encyclopedia (Pham, Ha Q. and Marks, Maurice J., Epoxy Resins, in *Ullmann's Encyclopedia of Industrial Chemistry*, Wiley-VCH Verlag GmbH & Co. KGaA: 2000). The range of reactive diluents sold by Huntsman under the name Araldite® in particular illustrates this value (see the brochure: "Advanced Materials—High Performance Components—Huntsman; section 7).

Reactive diluents act as solvents during the manufacture and shaping of multiple polymerizable and/or crosslinkable compositions for the manufacture for example of resin, adhesives, various coatings such as paints, lacquers, varnishes, or matrices for composites. Compared to said solvents, they have the advantage of not evaporating or migrating since they participate in the creation of the three-dimensional network. In the case of polymerizable and/or crosslinkable compositions based on epoxy resin, their prime role is to reduce the viscosity of said resin, thus improving its "machinability". This machinability refers to the ability of the resin to be used to produce crosslinkable compositions that are sometimes complex, since they are based on many other additives such as fillers, pigments, biocides, antifoams, etc.

There is a wealth of prior art relating to reactive diluents, in particular intended for polymerizable organic matrices of epoxy or epoxy resin type. Reference may particular be made to the brochure by Huntsman discussed above. The Araldite® range is offered therein by way of many products, such as those based on butanediol diglycidyl ether (Araldite® DY 026), alkyl (C12-C14) glycidyl ether (Araldite® DY-E) or else trimethylolpropane triglycidyl ether (Araldite® DY-T).

As such, while seeking to guarantee an excellent performance level to the reactive diluents that he/she manufactures, a person skilled in the art must today incorporate new constraints, in particular in terms of the environment. The development of polymer materials resulting from biological resources renewable in the short term has indeed become a major ecological and economic imperative, in the face of the exhaustion and of the increase in costs of fossil resources such as oil. Within this context, the use of dianhydrohexitols, resulting from vegetable (poly)saccharides, appears promising for replacing monomers of petrochemical origin.

Within such a context, the applicant company has succeeded in identifying products that satisfy these environment constraints, and which, quite surprisingly, behave as excellent reactive diluents for polymerizable and/or crosslinkable compositions in particular based on epoxy resin, advantageously reducing the Brookfield viscosity of said compositions.

Furthermore, unlike conventional reactive diluents, the products whose use is the subject of the present invention make it possible to very modestly reduce the glass transition temperature of the polymerized and/or crosslinked compositions. The conventional reactive diluents specifically have the major drawback of plasticizing the polymerized and/or crosslinked composition and of therefore reducing the glass transition temperature of said composition.

The products whose use is the subject of the present invention also make it possible to improve the mechanical properties and in particular the impact strength of the polymerized or crosslinked compositions. This is even more surprising and advantageous since it is well known that the reactive diluents may negatively impact these properties, as emphasized in the document "Ullman encyclopedia of industrial chemistry" (Pham, Ha Q. and Marks, Maurice J., Epoxy Resins, in *Ullmann's Encyclopedia of Industrial Chemistry*, Wiley-VCH Verlag GmbH & Co. KGaA: 2000) already discussed.

As demonstrated by the examples that support the present application, the performance level attained for the mechanical properties and in particular the impact strength of the polymerized and/or crosslinked compositions containing the products whose use is the subject of the present invention is much greater than that obtained with commercial reactive diluents, such as butanediol diglycidyl ether, alkyl (C12-C14) glycidyl ether or else trimethylolpropane triglycidyl ether.

The products in question and whose use is the subject of the present invention, which are furthermore already known, consist of bis-anhydrohexitol ethers
of formula (I):

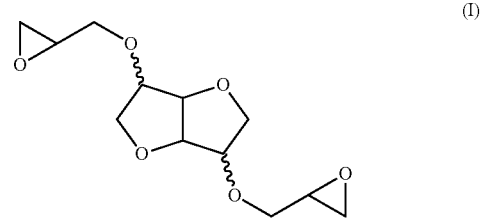 [SMILES: C1OC1COC1COC2C(OCC3CO3)COC12]

and having a Brookfield viscosity, measured at 20° C., of less than 500 mPa·s.

Independently of their viscosity, these products are today widely known and described in the literature, as is their synthesis process. Nevertheless, it had never been envisaged or suggested to use such products as reactive diluents.

One of the methods known for their synthesis is based on the initial formation of a solution of an isohexide salt in the presence of highly reactive species such as sodium hydride or sodium metal, and then the reaction with epichlorohydrin. Document U.S. Pat. No. 3,272,845 is one illustration thereof.

U.S. Pat. No. 4,770,871 proposes an alternative method, which avoids making use of the metal hydride or the sodium metal. This method consists in reacting a bis-anhydrohexitol and an alkyl carbonate in the presence of a basic catalyst, and under high temperature and pressure conditions (200 to 300° C., 5 MPa).

Document WO 2008/147472 is also known, which describes another process that does not use the aforementioned dangerous compounds. This document proposes a method of synthesis by dissolving an isohexitol in a solvent, adding a base, carrying out an azeotropic distillation with the solvent, adding a compound chosen from the group consisting of an alkyl halide or aralkyl halide, and a sulfonate ester of the alcohol equivalent to the alkoxide, and heating in order to carry out the etherification reaction and obtain the desired product.

Document U.S. Pat. No. 3,041,300 for its part proposes a process that consists in reacting isosorbide and epichlorohydrin at atmospheric pressure and under hot conditions (around 110° C.), in very slowly adding a basic reagent such as a solution of sodium hydroxide (over at least 4 hours) and in carrying out an azeotropic distillation. After filtration and rinsing, the bis-anhydrohexitol ether thus formed is then recovered.

More recently, document WO 2012/157832 proposed a variant of this technique, by this time carrying out the reaction between the isosorbide and the epichlorohydrin still under atmospheric pressure but at a more moderate temperature (40° C.).

Finally, document WO 2008/147473 describes 3 of the previous processes:
  in its example 1, the method based on an azeotropic distillation in the presence of solvent according to document WO 2008/147472,
  in its example 2, the method using sodium hydride according to document U.S. Pat. No. 3,272,845,
  in its example 4, the method based on the very slow addition of sodium hydroxide and the azeotropic distillation according to documents U.S. Pat. No. 3,041,300 and WO 2012/157832.

This document WO 2008/147473 teaches another route, which is a two-step process, the first step consisting in reacting isohexitol with epichlorohydrin in the presence of boron trifluoride, then in adding an alkaline solution (example 3 of this document).

Document WO 2013/188253 is also known, which describes a method consisting in:
  reacting an isohexide stereoisomer with a Brönsted base, the conjugate acid of which has a pKa greater than 16,
  reacting the resulting product with an alkyl bromide,
  reacting the resulting product with at least 2 molar equivalents of meta-chloroperbenzoic acid.

The applicant company has itself protected a novel process for manufacturing these products in patent application FR 3 016 631, said process comprising the following steps:
  a) bringing an dianhydrohexitol into contact with an organic halide,
  b) placing the resulting mixture of dianhydrohexitol and organic halide under vacuum so as to obtain a negative pressure of between 100 mbar and 1000 mbar,
  c) heating the mixture under vacuum at a temperature of between 50° C. and 120° C. and thus carrying out an azeotropic distillation,
  d) then adding to said mixture a basic reagent over a period of between 1 hour and 10 hours and then continuing the azeotropic distillation,
  e) recovering the bis-anhydrohexitol ether composition after a filtration step, concentration of the filtrate and optionally a purification step.

This process has the advantage of being both free of solvents and other potentially dangerous compounds such as the metal hydride, sodium metal, or boron trifluoride.

The present invention is not in any case limited by the process for obtaining the composition of bis-anhydrohexitol ethers of formula (I). It should be noted that all of the aforementioned processes in fact result in mixtures of compounds of formula (II), the viscosity of which depends in particular on the presence and the amount of oligomers. In this respect, although the composition obtained did not immediately have the required characteristic in terms of viscosity (Brookfield viscosity of less than 500 mPa·s at 20° C.), a person skilled in the art would then be able to apply a subsequent treatment (such as a distillation) in order to eliminate sufficient oligomeric species, and therefore reduce the viscosity of the medium.

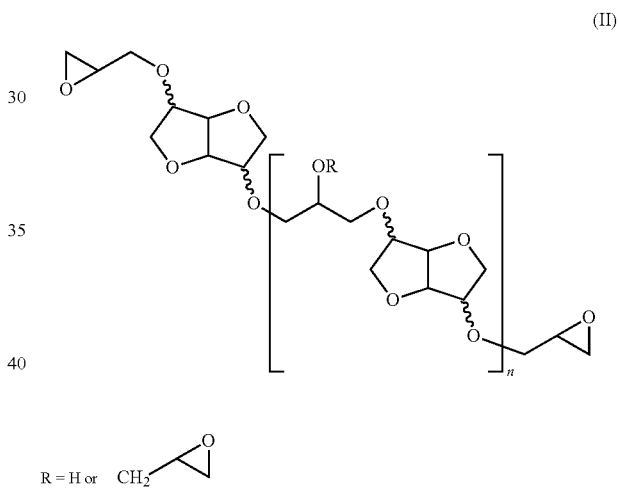

In this respect, and according to one preferred variant, the bis-anhydrohexitol ether of formula (I) is the one obtained by the process described in the aforementioned patent application FR 3 016 631, with implementation of the purification step (in step e)) in the form of a fractionation step, such as in particular carried out by distillation.

Nothing would suggest carrying out such a fractionation step and more particularly a distillation step in the aforementioned application, with a view to obtaining an effective reactive diluent. A fortiori, nothing disclosed or encouraged this distillation step to be carried out so as to target a Brookfield viscosity of less than 500 mPa·s at 20° C. But what still remains the most surprising is that such a product performs even better than the best reactive diluents on the market, which are those exemplified in the present application and described above, in particular under terms and brands that are not only well known to a person skilled in the art but also to the general public, such as Araldite®.

In this respect, the products whose use is the subject of the present invention specifically make it possible to obtain polymerized and/or crosslinked materials that exhibit an as yet unequalled compromise in terms of mechanical properties and maintaining the glass transition temperature. It is recalled in this regard that the products used as comparatives in the patent application FR 3 016 631 were none other than "identical" products from a chemical point of view, but obtained by different processes and therefore not known as reactive diluents and therefore much less discriminating in this regard.

Another element of surprise lies in the "intrinsic" Brookfield viscosity of the products whose use is the subject of the present invention. This viscosity is much higher than that of the reactive diluents from the prior art (as indicated in table 1 below). It is utterly surprising to obtain an as yet equalled compromise between mechanical properties and glass transition temperature, when the general teaching consisted in minimizing the viscosity of a reactive diluent with a view to obtaining such a performance.

Therefore, a first subject of the present invention consists of the use, as reactive diluent for the preparation of a polymerizable and/or crosslinkable resin, adhesive, coating or composite matrix composition, of at least one bis-anhydrohexitol ether
of formula (I):

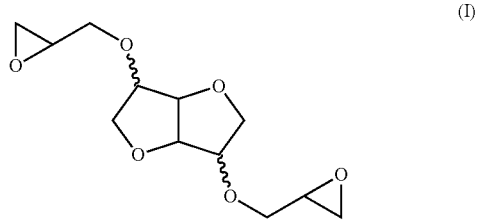 [SMILES: C1OC1COC1COC2C(OCC3CO3)COC12]

and having a Brookfield viscosity, measured at 20° C., of less than 500 mPa·s.

This use is also characterized in that the compound of formula (I) has a Brookfield viscosity preferentially of less than 400 mPa·s, very preferentially of less than 300 mPa·s and more preferentially still of between 50 and 300 mPa·s, and most preferably of all of between 100 and 300 mPa·s.

The role of a "reactive diluent" in the present application covers the ability of the product in question to lower the viscosity of the polymerizable and/or crosslinkable composition in which it is intended to be incorporated.

This use is also characterized in that the compound of formula (I) has an epoxy equivalent weight of between 129 and 145 g/eq, preferentially between 129 and 136 g/eq. This equivalent is measured according to the ISO 3001 or ASTM D1652 standard.

This use is also characterized in that the compound of formula (I) has a weight content of chlorine of less than 0.5%, preferentially of less than 0.3%. This content is measured according to the ISO 21627-3 standard.

Preferably, this use is characterized in that said crosslinkable and/or polymerizable composition is based on a polymerizable organic matrix of epoxy type. Reference may then be made to a composition based on epoxy resin.

One preferred subject of the present invention therefore consists of the use, as reactive diluent for the preparation of a polymerizable and/or crosslinkable resin, adhesive, coating or composite matrix composition, of at least one bis-anhydrohexitol ether
of formula (I):

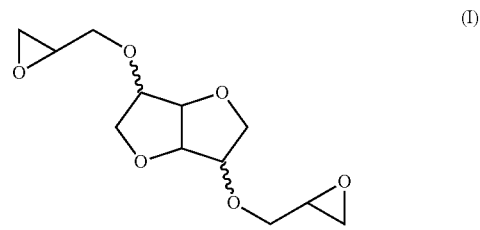 [SMILES: C1OC1COC1COC2C(OCC3CO3)COC12]

and having a Brookfield viscosity, measured at 20° C., of less than 500 mPa·s, said polymerizable and/or crosslinkable composition being based on a polymerizable organic matrix of epoxy type.

Most of the polymerizable and/or crosslinkable compositions used for, in particular, the manufacture of a resin, adhesive, coating or composite matrix are complex products for which the implementation processes and the final properties are adapted to the requirements of the customer by the skills of the formulators.

In the case of polymerizable and/or crosslinkable compositions based on a polymerizable organic matrix of epoxy type, these compositions contain, besides said polymerizable organic matrix, at least one hardener and/or one accelerator.

The crosslinking may be carried out at ambient temperature or at high temperature (above 100° C.) and/or under (UV or electron-beam) radiation by cationic crosslinking.

An accelerator is understood to mean compounds that make it possible to catalyze the homopolymerization reaction between the epoxy functions or between the epoxy functions and the accelerator. Lewis acids, Lewis bases and photoinitiators are examples thereof.

A hardener is understood to mean any compound that makes it possible to form a three-dimensional network by reaction with the epoxy functions. Amines, amidoamines, Mannich bases, organic acids or anhydrides, latent hardeners (dicyandiamide type, imidazole type, etc.) and carboxyl-terminated polyesters are examples thereof.

Within the context of one-component systems, the accelerators and/or hardeners are directly incorporated into the resin: this is referred to as a 1K system. Whereas in two-component (2K) systems, the hardener and/or hardener is formulated separately and the mixing only takes place at the time of the application and shaping of the resin. The polymerizable and/or crosslinkable compositions may also contain organic or inorganic fillers (silica, sand, aluminum oxide, talc, calcium carbonate, etc.), pigments, plasticizers, stabilizers, thixotropic agents.

Since the viscosity of certain polymerizable and/or crosslinkable compositions based on a polymerizable organic matrix of epoxy type is too high for them to be shaped, diluents are used in order to improve the machinability of the compositions. The processing and the shaping of the polymerizable and/or crosslinkable compositions based on a polymerizable organic matrix of epoxy type or based on epoxy resin are then facilitated as well as the dispersion of the additives or fillers.

Among the constituents of the epoxy resins, mention may be made of bisphenol A glycidyl ethers (DGEBA), novolac resins (of phenol or cresol type), bisphenol F-based epoxy resins, cycloaliphatic epoxy resins, brominated epoxy resins, etc. By way of example, the standard grades of DGEBA liquid resins have a viscosity between 10 000 and 15 000 mPa·s at 25° C. (DER 331, EPON 828) and the novolac resins have a viscosity of greater than 20 000 mPa·s (Araldite EPN 1138).

The amount of reactive diluent added to the polymerizable and/or crosslinkable composition is adapted as a function of the final viscosity desired by the specifications. Generally, amounts of a 5% to 50% by dry weight relative to the total weight (polymerizable composition, preferably based on epoxy resin and reactive diluent) are used. The reactive diluent is then added, preferably under mechanical stirring, to the polymerizable and/or crosslinkable composition in order to obtain a homogeneous mixture.

The bis-anhydrohexitol ether is added to said polymerizable and/or crosslinkable composition by any technique well known to a person skilled in the art.

The use of reactive diluent for the preparation of polymerizable and/or crosslinkable compositions enables the manufacture of composites by casting, coating, infusion, impregnation, lamination, injection, pultrusion or filament winding.

The use of reactive diluent for the preparation of polymerizable and/or crosslinkable compositions also makes it possible to facilitate depositions of thin layers, the use of a spray gun or a roller and the sufficient wettability of the supports or fibers.

The fields of application of the present invention are in particular those of the construction industry and civil engineering industry (floor covering, concrete), composite repair or manufacture, adhesives, inks or paints, and electronics (coating of thermoplastic housings, covering of printed circuits).

Another subject of the present invention consists of a polymerizable and/or crosslinkable resin, adhesive, coating or composite matrix composition, said composition comprising:
a polymerizable and/or crosslinkable organic matrix;
at least one bis-anhydrohexitol ether
of formula (I):

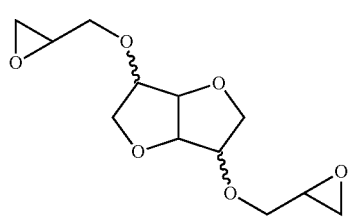

and having a Brookfield viscosity, measured at 20° C., of less than 500 mPa·s.

This polymerizable and/or crosslinkable composition is also characterized in that the compound of formula (I) has a Brookfield viscosity, measured at 20° C., preferentially of less than 400 mPa·s, very preferentially of less than 300 mPa·s and more preferentially still of between 50 and 300 mPa·s, and most preferably of all of between 100 and 300 mPa·s.

This polymerizable and/or crosslinkable composition is also characterized in that the ether of formula (I) has an epoxy equivalent weight of between 129 and 145 g/eq, preferentially between 129 and 136 g/eq. This equivalent is measured according to the ISO 3001 or ASTM D1652 standard.

This polymerizable and/or crosslinkable composition is also characterized in that the compound of formula (I) has a total weight content of chlorine of less than 0.5%, preferentially of less than 0.3%. This content is measured according to the ISO 21627-3 standard.

This polymerizable and/or crosslinkable composition is also characterized in that the polymerizable and/or crosslinkable matrix is of epoxy type or based on epoxy resin.

The polymerizable and/or crosslinkable composition according to present invention may comprise at least one hardener and/or one accelerator.

Thus, one subject of the present invention is a polymerizable and/or crosslinkable resin, adhesive, coating or composite matrix composition, said composition comprising:
an epoxy resin as polymerizable and/or crosslinkable organic matrix;
at least one bis-anhydrohexitol ether
of formula (I):

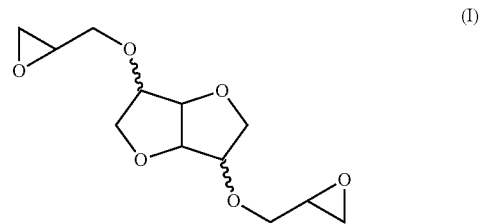 [SMILES: C1OC1COC1COC2C(OCC3CO3)COC12]

and having a Brookfield viscosity, measured at 20° C., of less than 500 mPa·s.

In the case where the polymerizable organic matrix is an epoxy resin, the crosslinkable and/or polymerizable composition additionally comprises at least one hardener and/or one accelerator.

Another subject of the present invention is the crosslinked and/or polymerized composition obtained by a crosslinking and/or polymerization of the composition as defined above.

The examples which follow make it possible to better understand the content of the present invention, without however limiting the scope thereof.

BRIEF DESCRIPTION OF THE DRAWING

The FIGURE shows the change in the glass transition temperature (Tg in ° C.) of the crosslinked resin or crosslinked composition measured in example 2, as a function of the Brookfield viscosity of the composition before crosslinking (in mPas, measured at 20 rpm and at 20° C.) measured in example 1.

EXAMPLES

The following examples relate to the use of various reactive diluents according to the invention (isosorbide diglycidyl ether) or according to the prior art (commercial products) in a crosslinkable composition based on a polymerizable organic matrix of epoxy type or based on epoxy resin.

Preparation of the Isosorbide Diglycidyl Ether:

125 g of isosorbide (0.86 mol, 1 molar equivalent), 395.6 g of epichlorohydrin (4.27 mol, 5 molar equivalents) and then 1.25 g of triethylammonium bromide (1 wt % relative to the isosorbide) are introduced into a 1-liter jacketed reactor, heated by a thermostatic heat-transfer fluid bath, equipped with a mechanical blade stirring system, with a system for controlling the temperature of the reaction medium and with a reverse Dean-Stark apparatus surmounted by a condenser.

The system is brought to a pressure of 275 mbar relative. The reaction mixture is heated to 80° C. (boiling point=80° C. at 275 mbar) before beginning the controlled addition of 136.9 g of a 50% aqueous sodium hydroxide solution (1.71 mol, 2 molar equivalents). The addition lasts for a total of 2 h 50 min. The water is then continuously eliminated by azeotropic distillation.

The reaction medium is filtered under vacuum in order to eliminate therefrom the sodium chloride formed over time and the catalyst. The salts are washed with epichlorohydrin which is then eliminated by evaporation under reduced pressure in a rotary evaporator. A step of purification by distillation under reduced pressure (<1 mbar) is carried out. The distillate obtained then corresponds to the isosorbide diglycidyl ether in the form of a clear and colorless liquid (Brookfield viscosity at 20° C. of 218 mPa·s) having an epoxy equivalent of 132 g/equivalent, and having a weight content of chlorine of 0.1% measured according to the ISO 21627-3 standard.

Characteristics of the Various Compounds Tested:

The main characteristics of the epoxy resin and of the various reactive diluents tested are found in table 1 (EE denoting the epoxy equivalent weight which is measured according to the ISO 3001 or ASTM D1652 standard).

TABLE 1

|  | Diluent 1 | Diluent 2 | Diluent 3 | Diluent 4 | Epoxy resin |
|---|---|---|---|---|---|
| Chemical name | Isosorbide diglycidyl ether | Trimethylolpropane triglycidyl ether | 1,4-butanediol diglycidyl ether | C12-C14 alcohol monoglycidyl ether | Bisphenol A diglycidyl ether (DGEBA) |
| Commercial name | — | Araldite DY-T | Eposir 7107 Araldite DY-D | Polypox R24 Araldite DY-E | Epotec YD128 |
| EE (g/eq) | 132 | 136 | 101 | 291.5 | 186 |
| Viscosity at 20° C. (mPa · s) | 218 | 168 | 14 | 8.3 | 14445 |

Example 1

This example relates to the manufacture of compositions between the bisphenol A diglycidyl ether (DGEBA) epoxy resin and various reactive diluents in varied proportions, and to the determination of the Brookfield viscosity at 20° C. of said compositions.

In order to do this, 100 g of DGEBA epoxy resin are mixed at ambient temperature with 11.1 g of reactive diluent. The mixture is brought to 20° C. and the viscosity is measured using a Brookfield rotational viscometer, of DV-II+ type. The measurement is carried out after stabilization of the medium maintained at 20° C. using a thermostatic water bath. The viscosity measurements are obtained with a torque, as % of the maximum torque, of between 10% and 100%.

Throughout the present application, the speed at which the Brookfield viscosity is determined is not indicated. This is because a person skilled in the art knows how to adapt it relative to the choice of the rotor and so as to be positioned at a percentage of the torque of between 10% and 100%.

Each composition is produced in the same way by increasing the amount of diluent so as to obtain compositions that comprise between 0 and 40% by weight of reactive diluent. For the commercial diluents, the % is understood to be the % as they are. Each composition is perfectly homogeneous and the viscosities at 20° C. are given in table 2.

TABLE 2

| % diluent by weight | diluent 1 | diluent 2 | diluent 3 | diluent 4 |
|---|---|---|---|---|
| 0 | 14 445 | 14 445 | 14 445 | 14 445 |
| 10 | 6575 | 5543 | 2160 | 1968 |
| 20 | 4343 | 3287 | 1032 | 744 |
| 30 | 3120 | 2016 | 431 | 234 |
| 40 | 1632 | 1296 | 211 | 126 |

Table 2 demonstrates that the introduction of 10% by weight of the reactive diluent according to the invention makes it possible to halve the viscosity of the mixture. Moreover, the viscosity levels comparable to those obtained with the products from the prior art are attained.

Example 2

This example relates to the crosslinking of the compositions obtained above, and to the determination of the glass transition temperatures of the thus crosslinked compositions.

The crosslinking of the crosslinkable compositions of epoxy resins is carried out in the presence of an amine hardener: isophorone diamine. The amount of isophorone diamine introduced is calculated so that the ratio of the number of —NH groups to the number of epoxy groups is equal to 1. Isophorone diamine is available under the brand name Vestamid® IPD from Evonik. The —NH group weight equivalent is 42.5 g/eq. The formula used to calculate the amounts of diamine to be used is the following:

$$m(\text{isophorone diamine}) = \frac{m\text{epoxy resin} \times 42.5}{EE \text{ epoxy resin}} + \frac{m\text{reactif diluent} \times 42.5}{EE\text{reactive diluent}}$$

By way of example, the process for the crosslinking of the mixture between the resin and 10% by weight of the reactive diluent according to the invention was as below, the other tests having been carried out according to the same protocol while adapting the amounts of products.

90 g of epoxy resin are mixed at ambient temperature with 10 g of reactive diluent 1. Next, x=23.7 g of isophorone diamine, (x being calculated using the above equation and depends on the EE of the chosen reactive diluent) are added and the mixture is stirred for 1 minute. The mixture, which is homogeneous and flows at ambient temperature, is placed in a silicone mould (L=43 mm, W=20 mm). The crosslinking is carried out for 1 day at ambient temperature followed by 1 day at 90° C. and 3 days at 130° C. in an oven. A material which is solid at ambient temperature and which has a glass transition temperature (Tg) of 149° C. is then obtained. The glass transition temperature is measured by differential scanning calorimetry (DSC) at the second pass of a temperature ramp from −100 to 200° C. at 10° C./min. The Tg values are reported in table 3.

TABLE 3

| % diluent by weight | diluent 1 | diluent 2 | diluent 3 | diluent 4 |
|---|---|---|---|---|
| 0 | 150 | 150 | 150 | 150 |
| 10 | 149 | 145 | 123 | 112 |
| 20 | 146 | 138 | 98 | 88 |
| 30 | 145 | 131 | 84 | 58 |
| 40 | 138 | 126 | 33 | 45 |

Surprisingly, the glass transition temperatures are much higher with the use of the reactive diluent according to the invention. These results are particular advantageous in view of an application of the crosslinked compositions or crosslinked resins for the manufacture of an object, of composites, coatings, adhesives, paints, inks, etc. likely to be exposed to high temperatures, above 120° C., without loss of properties during their use.

The FIGURE represents, for each reactive diluent, the change in the glass transition temperature (Tg in ° C.) of the crosslinked resin or crosslinked composition measured in example 2, as a function of the Brookfield viscosity of the composition before crosslinking (in mPa·s, measured at 20 rpm and at 20° C.) measured in example 1.

The FIGURE very clearly illustrates that the reactive diluent 1 according to the invention offers the best compromise between the viscosity of the mixture and the glass transition temperature of the crosslinked mixture.

Example 3

This example relates to the determination of a certain number of mechanical properties on test specimens obtained with the use of:
no reactive diluent (test no. 1 according to the prior art)
40% by weight of reactive diluent 1 (test no. 2 according to the invention)
40% by weight of reactive diluent 2 (test no. 3 according to the prior art).

The mechanical properties are determined by a tensile test on flat test specimens:
Young's modulus or modulus of elasticity (MPa): corresponds to the mechanical stress that an elongation of 100% of the initial length of the test specimen would generate (determined according to the method described in the ASTM D638 standard)
tensile strength (MPa): corresponds to the mechanical tensile stress exerted on a test specimen until it breaks (determined according to the method described in the ASTM D638 standard)
elongation at break: defines the capacity of a material to be stretched before breaking (determined according to the method described in the ASTM D638 standard)
toughness ($K_{IC}$): characterizes the property of a material to resist fracture when a crack is present. The higher the value of $K_{IC}$, the more energy the material can absorb before breaking (determined according to the method described in the ASTM D5045 standard).

The results are given in table 4. The numbers of the tests refer to the compositions indicated at the start of example 3.

TABLE 4

| Test No. | Tg (° C.) | Young's modulus (MPa) | Tensile strength (MPa) | Elongation at break (%) | Toughness $K_{IC}$ (MPa·m$^{1/2}$) |
|---|---|---|---|---|---|
| 1 | 150 | 1744 | 49.7 | 3.5 | 0.79 |
| 2 | 138 | 1710 | 57.7 | 4.4 | 1.07 |
| 3 | 126 | 1630 | 54.5 | 4.4 | 0.79 |

The incorporation of isosorbide diglycidyl ether makes it possible to dramatically improve the mechanical and impact strength properties.

The reactive diluent according to the invention therefore has many advantages:
it offers the best compromise between the viscosity of the mixture and the glass transition temperature of the crosslinked mixture;
it results in excellent mechanical properties;
it significantly increases the toughness of the epoxy network, at least as much as 20% for a liquid elastomer of CTBN type, while retaining a very low initial viscosity and without having to the deal with the problem of phase separation induced by the polymerization (the network is homogeneous from a thermodynamic point of view) which is the lot of all additives of liquid elastomer type.

The invention claimed is:
1. A process for the preparation of a diluted polymerizable and/or crosslinkable resin, adhesive, coating, or composite matrix composition based on a polymerizable organic epoxy matrix, comprising
adding (i) at least one hardener and/or at least one accelerator and (ii), as a reactive diluent, at least one bis-anhydrohexitol ether of formula (I):

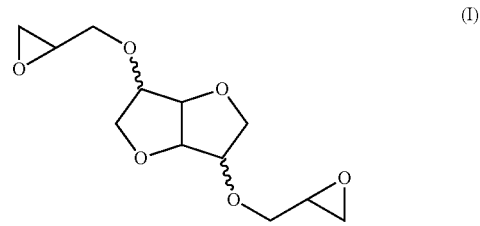 [SMILES: C1OC1COC1COC2C(OCC3CO3)COC12]

and having a Brookfield viscosity, measured at 20° C., of less than 500 mPa·s to a first composition based on a polymerizable organic epoxy matrix to obtain the diluted polymerizable and/or crosslinkable resin, adhesive, coating or composite matrix composition;
wherein said diluted polymerizable and/or crosslinkable resin, adhesive, coating or composite matrix composition has a lower viscosity than a viscosity of the first composition.

2. The process as claimed in claim 1, wherein the compound of formula (I) has a Brookfield viscosity, measured at 20° C., of less than 400 mPa·s.

3. The process as claimed in claim 1, wherein the compound of formula (I) has a Brookfield viscosity, measured at 20° C., of less than 300 mPa·s.

4. The process as claimed in claim 1, wherein the compound of formula (I) has a Brookfield viscosity, measured at 20° C. of between 50 and 300 mPa·s.

5. The process as claimed in claim 1, wherein the compound of formula (I) has a Brookfield viscosity, measured at 20° C. of between 100 and 300 mPa·s.

6. The process as claimed in claim 1, wherein the compound of formula (I) has an epoxy equivalent weight of between 129 and 145 g/eq.

7. The process as claimed in claim 1, wherein the compound of formula (I) has an epoxy equivalent weight of between 129 and 136 g/eq.

8. The process as claimed in claim 1, wherein the compound of formula (I) has a weight content of chlorine of less than 0.5%.

9. The process as claimed in claim 1, wherein the compound of formula (I) has a weight content of chlorine of less than 0.3%.

10. The process as claimed in claim 1, wherein the polymerizable organic epoxy matrix is selected from the group consisting of bisphenol A glycidyl ethers (DGEBA), phenol novolac resins, cresol novolac resins, bisphenol F-based epoxy resins, cycloaliphatic epoxy resins, and brominated epoxy resins.

11. The process as claimed in claim 10, wherein the polymerizable organic epoxy matrix is a bisphenol A diglycidyl ether resin.

12. A polymerizable and/or crosslinkable resin, adhesive, coating, or composite matrix composition, said composition comprising:
an epoxy resin as polymerizable and/or crosslinkable organic matrix;
at least one hardener and/or at least one accelerator; and
at least one bis-anhydrohexitol ether of formula (I):

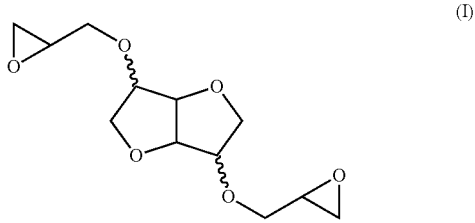 [SMILES: C1OC1COC1COC2C(OCC3CO3)COC12]

and having a Brookfield viscosity, measured at 20° C., of less than 500 mPa·s and having a role of a reactive diluent in said composition, reducing the viscosity of the epoxy resin as polymerizable and/or crosslinkable organic matrix.

13. The polymerizable and/or crosslinkable composition as claimed in claim 12, wherein the compound of formula (I) has a Brookfield viscosity, measured at 20° C., of less than 400 mPa·s.

14. The polymerizable and/or crosslinkable composition as claimed in claim 12, wherein the compound of formula (I) has a Brookfield viscosity, measured at 20° C., of less than 300 mPa·s.

15. The polymerizable and/or crosslinkable composition as claimed in claim 12, wherein the compound of formula (I) has a Brookfield viscosity, measured at 20° C., of between 50 and 300 mPa·s.

16. The polymerizable and/or crosslinkable composition as claimed in claim 12, wherein the compound of formula (I) has a Brookfield viscosity, measured at 20° C., of between 100 and 300 mPa·s.

17. The polymerizable and/or crosslinkable composition as claimed in claim 12, wherein the compound of formula (I) has an epoxy equivalent weight of between 129 and 145 g/eq.

18. The polymerizable and/or crosslinkable composition as claimed in claim 12, wherein the compound of formula (I) has an epoxy equivalent weight of between 129 and 136 g/eq.

19. The polymerizable and/or crosslinkable composition as claimed in claim 12, wherein the compound of formula (I) has a weight content of chlorine of less than 0.5%.

20. The polymerizable and/or crosslinkable composition as claimed in claim 12, wherein the compound of formula (I) has a weight content of chlorine of less than 0.3%.

21. The polymerizable and/or crosslinkable composition as claimed in claim 12, wherein the epoxy resin as polymerizable and/or crosslinkable organic matrix is selected from the group consisting of bisphenol A glycidyl ethers (DGEBA), phenol novolac resins, cresol novolac resins, bisphenol F-based epoxy resins, cycloaliphatic epoxy resins, and brominated epoxy resins.

22. The polymerizable and/or crosslinkable composition as claimed in claim 21, wherein the epoxy resin as polymerizable and/or crosslinkable organic matrix is a bisphenol A diglycidyl ether resin.

23. A crosslinked composition obtained from the composition as claimed in claim 12.

* * * * *